United States Patent
Heintel et al.

(10) Patent No.: US 11,355,931 B2
(45) Date of Patent: Jun. 7, 2022

(54) METHOD OF OPERATING AN ELECTRICAL GRID

(71) Applicants: Franziska Heintel, Essen (DE); Sam Warburton, Essen (DE); Jürgen Waffner, Essen (DE)

(72) Inventors: Franziska Heintel, Essen (DE); Sam Warburton, Essen (DE); Jürgen Waffner, Essen (DE)

(73) Assignee: Conjoule GmbH, Essen (DE)

(*) Notice: Subject to any disclaimer, the term of this patent is extended or adjusted under 35 U.S.C. 154(b) by 137 days.

(21) Appl. No.: 16/585,707

(22) Filed: Sep. 27, 2019

(65) Prior Publication Data

US 2020/0028360 A1 Jan. 23, 2020

Related U.S. Application Data

(63) Continuation of application No. PCT/EP2017/057414, filed on Mar. 29, 2017.

(51) Int. Cl.
*H02J 3/00* (2006.01)
*G05B 15/02* (2006.01)
(Continued)

(52) U.S. Cl.
CPC .............. *H02J 3/005* (2013.01); *G05B 15/02* (2013.01); *G05F 1/66* (2013.01); *H02J 3/003* (2020.01); *G01R 19/2513* (2013.01)

(58) Field of Classification Search
CPC .. H02J 3/005; H02J 3/003; H02J 3/007; H02J 2300/10; H02J 3/381; H02J 3/008;
(Continued)

(56) References Cited

U.S. PATENT DOCUMENTS

| 8,244,462 B1 * | 8/2012 | Zhu ......................... G01C 5/00 701/408 |
| 2010/0207454 A1 * | 8/2010 | Jagota ...................... H02J 1/10 307/80 |

(Continued)

FOREIGN PATENT DOCUMENTS

| DE | 10 2015 114 215 A1 | 3/2017 |
| JP | 2012-010489 A | 1/2012 |

(Continued)

OTHER PUBLICATIONS

Lin J., Yu W., Griffith D., Yang X., Xu G., Lu C. (2013) On Distributed Energy Routing Protocols in the Smart Grid. In: Lee R. (eds) Software Engineering, Artificial Intelligence, Networking and Parallel/Distributed Computing. Studies in Computational Intelligence, vol. 492. Springer, Heidelberg. (Year: 2013).*

(Continued)

*Primary Examiner* — Christopher E. Everett
(74) *Attorney, Agent, or Firm* — Reinhart Boerner Van Deuren P.C.

(57) ABSTRACT

Embodiments of a method of operating an electrical grid having at least one electrical consumer and a plurality of electrical producers are disclosed. In the method, a consumption prediction for the electrical consumer is provided, and production predictions for each electrical producer of a plurality of electrical producers are provided. The respective distances between the electrical consumer and each electrical producer of the plurality of electrical producers are determined. An electrical producer of the electrical producers is allocated to the electrical consumer in a first allocating step such that the provided consumption prediction of the electrical consumer matches to the provided production prediction of the at least one electrical producer and such that the determined distance between the electrical consumer
(Continued)

and the at least one electrical producer is at least smaller than at least one first distance limit.

12 Claims, 4 Drawing Sheets

(51) Int. Cl.
 *G05F 1/66* (2006.01)
 *G01R 19/25* (2006.01)
(58) Field of Classification Search
 CPC ....... G05B 15/02; G05F 1/66; G01R 19/2513; Y02E 40/70; Y04S 10/50; Y04S 10/12; Y04S 50/10; H04L 2209/38; H04L 9/3239
 See application file for complete search history.

(56) References Cited

U.S. PATENT DOCUMENTS

| | | | |
|---|---|---|---|
| 2016/0117657 A1* | 4/2016 | Forbes, Jr. | G06Q 20/145 705/7.31 |
| 2016/0314459 A1 | 10/2016 | Mazlaghani | |
| 2017/0103468 A1* | 4/2017 | Orsini | G07F 15/003 |

FOREIGN PATENT DOCUMENTS

| | | |
|---|---|---|
| JP | 2016-010276 A | 1/2016 |
| JP | 2017-011968 A | 1/2017 |

OTHER PUBLICATIONS

A. Brocco, "Fully distributed power routing for an ad hoc nanogrid," 2013 IEEE International Workshop on Inteligent Energy Systems (IWIES), Vienna, Austria, 2013, pp. 113-118 (Year: 2013).*
Beitollahi, Hakem, and Geert Deconinck. "Peer-to-peer networks applied to power grid." Proceedings of the International conference on Risks and Security of Internet and Systems (CRiSIS)'in conjunction with the IEEE GIIS. vol. 7. 2007 (Year: 2007).*
J. Ma, L. Song and Y. Li, "Optimal Power Dispatching for Local Area Packetized Power Network," in IEEE Transactions on Smart Grid, vol. 9, No. 5, pp. 4765-4776, Sep. 2018, doi: 10.1109/TSG. 2017.2669907 (Date of Publication Feb. 15, 2017). (Year: 2017).*
T. Zhu, Sheng Xiao, Yi Ping, D. Towsley and Weibo Gong, "A secure energy routing mechanism for sharing renewable energy in smart microgrid," 2011 IEEE International Conference on Smart Grid Communications (SmartGridComm), 2011, pp. 143-148, doi: 10.1109/SmartGridComm.2011.6102307. (Year: 2011).*
Sijie Chen et al., From Demand Response to Transactive Energy: State of the Art, Journal of Modern Power Systems and Clean Energy, vol. 5, No. 1, Dec. 30, 2016, 10 pages.
Felix Hasse et al., Blockchain—An Opportunity for Energy Producers and Consumers, PwC global power & utilities, 46 pages.

* cited by examiner

METHOD OF OPERATING AN ELECTRICAL GRID

CROSS-REFERENCE TO RELATED PATENT APPLICATIONS

This patent application is a continuation of PCT/EP2017/057414, filed Mar. 29, 2017, the entire teachings and disclosure of which are incorporated herein by reference thereto.

FIELD

The application relates to a method of operating an electrical grid having at least one electrical consumer and a plurality of electrical producers. The application relates also to a peer-to-peer application and to a system having at least one electrical consumer and a plurality of electrical producers.

BACKGROUND

An electrical grid (e.g. AC and/or DC grid) and electrical network, respectively, usually comprises a plurality of electrical producers and a plurality of electrical consumers and/or a combination of producers and consumers (so called prosumers). An electrical consumer might be arranged in a consumer entity (e.g. a building, factory, etc.) and/or an electrical consumer may be arranged in a producer entity. An electrical consumer can be connected to the one or more power line(s) of an electrical grid. An electrical consumer and load, respectively, may receive and consume electrical power from the electrical grid. An electrical producer is configured to produce electrical power by converting another energy form and to feed said electrical power into the electrical grid.

An electrical grid is operated and controlled by a grid operator by means of a central control entity in form of a server. A main task of the central control entity is to keep at least one electrical grid parameter, in particular, the grid voltage and/or the grid frequency, (sufficiently) steady. In particular, in order to keep demand and load fluctuations small, consumption predictions for each of the electrical consumers (or a group of consumers) and production predictions for each of the electrical producers (or group of producers) may be determined and e.g. provided to the server. Based on the provided consumption predictions and production predictions, in particular, controllable producers and/or controllable consumers can be controlled such that the power fed into the electrical grid matches the power drawn from the electrical grid (at each time).

In known systems and methods, it is regularly necessary to transmit power from a producer to a consumer over long distances. Furthermore, it is not possible in the known systems to determine the specific producer which supplied the power (or part of the power) consumed by a specific consumer. A further drawback of prior art systems is the server-client structure of these systems. Usually, as described above, a central server is used. A disadvantage of server-client structures of this kind, particularly the server (or platform), apart from the high transaction costs, is that the central instance or central server manages confidential data including e.g. user data, authorization data, provider data, control data, prediction data or the like. A persistent problem affecting the central instance is that of protecting the confidential data stored on one or more server(s) from access by unauthorized third parties. In particular, a high degree of security expenditure is required, in order to prevent said data from being tampered with. This in turn leads to even higher transaction costs. A further disadvantage is the complex and costly infrastructure for providing the described server-client structure.

Therefore, it is an object of the present invention to provide a method which at least reduces the above drawbacks, and which, in particular, enables to operate such a system more efficient and, at the same time, with a higher security level.

BRIEF SUMMARY

The above object is solved according to a first aspect of the present application by a method of operating an electrical grid having at least one electrical consumer and a plurality of electrical producers as described herein. The method comprises providing at least one consumption prediction for the electrical consumer. The method comprises providing respective production predictions for each electrical producer of at least a part of the plurality of electrical producers. The method comprises determining the respective distances between the electrical consumer and each electrical producer of the part of the plurality of electrical producers. The method comprises allocating at least one electrical producer of the part of the electrical producers to the electrical consumer in a first allocating step such that the provided consumption prediction of the electrical consumer matches to the provided production prediction of the at least one electrical producer and such that the determined distance between the electrical consumer and the at least one electrical producer is at least smaller than at least one first distance limit.

In contrast to the prior art methods, according to the present application by determining a distance between an electrical consumer and an electrical producer and by allocating one or more electrical producer(s) to at least one electrical consumer depending on their respective distance to each other, the transmission paths of the electric power can be shortened. Further, by (in particular, temporarily) allocating one or more electrical producer(s) to a specific consumer based on the estimated power production and estimated power consumption, it is possible to determine the one or more electrical producer(s) currently used by the electrical consumer for operating said consumer. In particular, the origin of the power consumed by the at least one electrical consumer is inspectable by interested third parties.

The at least one electrical grid may be a conventional electrical grid, such as a high-voltage grid, medium-voltage grid and/or low-voltage grid. A plurality of electrical devices can be connected with the one or more power line(s) of the at least one electrical grid. An electrical device may be an electrical consumer (e.g. furnace, cold store, etc.) and load respectively, and/or an electrical producer (e.g. photovoltaic device, wind turbine, a gas-driven power station, etc.). Also an electrical storage can temporarily act as an electrical consumer or electrical producer.

Furthermore, a consumption prediction for the at least one electrical consumer can be provided e.g. by the electrical consumer itself or another device. A consumption prediction is, in particular, time dependent and may represent the expected and estimated, respectively, power consumption by the electrical consumer during a specific future time period (e.g. next week, next day, next hour, next 15 min, etc.). A consumption prediction might be an estimated load profile of the electrical consumer. It shall be understood that two or more consumers (e.g. from a single consumer entity) can be aggregated to a group of consumers. In this case, providing a consumption prediction for the consumer includes providing an (aggregated) consumption prediction for the group of consumers.

In addition, an individual production prediction can be provided for each electrical producer of at least a part (>1) of the plurality of electoral producers e.g. by the respective electrical producers themselves or another device. Similarly to a consumption prediction, a production prediction is, in particular, time dependent and may represent the expected and estimated, respectively, power supplied by the electrical producer to the grid during a specific future time period (e.g. next week, next day, next hour, next 15 min, etc.). A production prediction might be an estimated production profile of the electrical producer. It shall be understood that two or more producers (e.g. from a single producer entity) can be aggregated to a group of producers. In this case, providing a production prediction for the producer includes providing an (aggregated) production prediction for the group of consumers.

Generally, a consumption/production prediction can be determined based on historical data relating to the past consumption/production of electrical power, (external) forecast data, such as weather forecast data and/or user specifications, such as calendar data, an individual's stay (including a forecast of when residents return home and/or when a business starts processing), capacity data relating to a storage, such as a battery, etc. The determination and e.g. creation of a consumption/production prediction may, in particular, be conducted by the respective consumer or producer (or its respective entity) entity, preferably a local application. Alternatively or additionally, a further device and/or means can determine and create a (consumption or production) prediction e.g. based on provided historical data relating to the past consumption/production of electrical power, (external) forecast data, such as weather forecast data and/or user specifications.

Furthermore, according to the present method, distances between the electrical consumer and each of the electrical producers of at least of a part of the plurality of generally available producers are determined. For instance, at least a first distance between the electrical consumer and a first electrical producer and a further distance between said electrical consumer and a further electrical producer can be determined. A distance might be the direct distance between two electrical devices, i.e. the shortest path between two electrical devices on a map, disregarding the electrical path between the two electrical devices, or a distance might be the length of the shortest electrical path between the two electrical devices. Preferably, all individual distances between a specific electrical consumer and generally available electrical producers might be determined.

Based on the determined distances and the provided consumption prediction and production predictions, one or more electrical producer(s) can be at least temporarily allocated to a specific electrical consumer. In particular, one or more electrical producer(s) can be allocated to the electrical consumer in a first allocating step such that the provided consumption prediction of the electrical consumer matches to the provided one or more production prediction(s) of the respective one or more electrical producer(s) and such that the determined distance between the electrical consumer and the at least one electrical producer is at least smaller than at least one first distance limit. Matching, in particular, means that the (time-dependent) consumption prediction corresponds to the one or more (time-dependent) production prediction(s) from the one or more producer(s). In other words, the estimated amount of energy supplied by the one or more electrical producer(s) is essentially equal to the estimated amount of energy consumed by the electrical consumer. This includes that only a portion of a (time-dependent) production prediction can be allocated to a consumer in order to achieve a matching. For instance, an overall production prediction can be divided in two or more (sub) production predictions of a single electrical producer.

According to one embodiment of the present application, allocating the at least one electrical producer of the part of the electrical producers to the electrical consumer in a first allocating step such that the determined consumption prediction of the electrical consumer matches to the determined production prediction of the at least one electrical producer may comprise allocating one or more electrical producer(s) of the part of the electrical producers to the consumer such that the power expected to be generated by the one or more electrical producer(s) during a specific future time period is essentially equal to the power expected to be consumed by the electrical consumer during the specific future time period.

In addition, an electrical producer may be (only) allocated to a specific electrical consumer if the distance between said devices is smaller than a first distance limit. The first distance limit may be predefined. Preferably, the first distance limit can be set to a value between 1 and 60 km, preferably between 3 and 10 km, in particular, between 4 and 5 km. Such a distance limit may ensure that (only) producers located within a certain radius (corresponding to the first distance limit) around the consumer are allocated. The distance limit may also define a specific area, such as a specific town, specific district, etc. Allocating means that two electrical devices are (temporarily) paired to each other.

It shall be understood that a producer can be allocated to two or more consumer at the same time. For instance, a portion of the supplied power of a producer can be allocated to a first consumer and a further portion of the producer can be allocated to a further consumer. In other words, an electrical producer can be allocated with a (sub) production prediction to a first electrical consumer and said electrical producer can be allocated with a further (sub) production prediction to a further electrical consumer.

Furthermore, an electrical producer may be part of a producer arrangement, such as a photovoltaic plant/park or wind turbine plant/park. In such a case, only one distance for the producer arrangement can be determined. In one case, only one electrical producer, in particular, the producer arrangement, may be allocated to the remotely arranged electrical consumer (e.g. part of a consumer arrangement (e.g. a factory or business entity comprising two or more electrical consumers)).

According to a preferred embodiment of the present application, at least one peer-to-peer network comprising at least one peer-to-peer application may be provided. The peer-to-peer application may comprise at least one allocating means. At least the first allocating step may be performed by executing the at least one allocating means of the peer-to-peer application by at least a part (>1) of the nodes of the peer-to-peer network.

In contrast to prior art methods, operating an electrical grid, in particular, conducting a previously described allocating step, is conducted in a more efficient and more secure way by at least executing at least one allocating means by at least a part (e.g. >1) of the nodes of a peer-to-peer network. In other words, an electrical grid can be managed and electrical devices can be allocated to each other without a central instance but by a peer-to-peer application of a peer-to-peer network. By the fact that instead of a central server or a platform, a peer-to-peer network (also called a framework) undertakes the, in particular, tamper-proof allocating step, by means of a peer-to-peer application, high security standards are achieved in that all computers (peer nodes or simply nodes) in the peer-to-peer network, at least a part of the nodes in the peer-to-peer network, at least monitor(s) preferably each allocating step and process, respectively, in particular, by executing e.g. the allocating means. Thereby, the transaction costs can be significantly reduced. No central, superior platform, server, cloud, etc. is required. The complexity of managing and controlling an electrical grid can be significantly reduced. Prediction data of electrical devices and/or other confidential data can be securely managed.

The system operated by the present method may comprise at least one peer-to-peer network with at least one peer-to-peer application. A peer-to-peer network according to the present application is characterized in that it comprises a plurality of nodes, wherein at least a part (>1) of the nodes comprises the same peer-to-peer application.

In comparison to a client server system in which a server provides a service and a client uses the service, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node and computer, respectively, of the peer-to-peer network comprises the (same) peer-to-peer application. This means that a plurality of nodes comprises the same executable means and executes such a means e.g. upon receipt of a trigger.

The present peer-to-peer application comprises at least one allocating means, preferably in form of a smart (or private) contract, configured to allocate at least one electrical producer of the part of the electrical producers to the electrical consumer in a first allocating step such that the provided consumption prediction of the electrical consumer matches to the provided production prediction of the at least one electrical producer and such that the determined distance between the electrical consumer and the at least one electrical producer is at least smaller than at least one first distance limit (as described above).

As previously described, a prediction can be locally determined and created by a respective consumer (or its entity) or producer (or its entity). In order to provide the created prediction, a peer-to-peer module assigned to the electrical consumer (or producer) can be provided.

According to one embodiment, at least one first peer-to-peer module can be assigned to an electrical consumer (or electrical producer). For instance, each electrical consumer and electrical producer (or at least each consumer entity and each producer entity) may comprise a separate peer-to-peer module. Preferably, each peer-to-peer module is uniquely assigned to a respective electrical device (and/or its entity). For instance, an electrical device can comprise a peer-to-peer module. Preferably, the peer-to peer module can be integrated in the electrical device (or the entity), such as an electrical consumer or electrical producer.

It is also possible that a communication connection is provided between the electrical device and a (remotely arranged) peer-to-peer module assigned to said electrical device. This means that the peer-to-peer module can at least communicate and/or act on behalf of the electrical device. For example, the peer-to-peer module can be partly formed by a separate processing device, such as mobile communication device (e.g. mobile phone, mobile computer, embedded computer/controller, etc.), or it can run on a remote stationary processing device (e.g. in a data center). In case of a mobile communication device or a remote processing device the at least one electrical device may have a (secure) communication channel to the processing device (or mobile communication device) of the data center and the processing device itself may have a connection to the peer-to-peer network. In an embodiment, the remote processing device may be a gateway to the peer-to-peer network. This means that the electrical device can securely communicate via its peer-to-peer module and the gateway to the peer-to-peer network. A peer-to-peer module might have a crypto chip or secure element to generate and store a public private key pair.

Generally, a peer-to-peer module according to the present application may be configured to communicate, e.g. send/receive messages to/from the peer-to-peer application. The peer-to-peer module may be a peer and node, respectively, of the peer-to-peer network. The peer-to-peer module may be configured to provide at least a created (consumption or production) prediction for the respective electrical device to the peer-to-peer application.

Alternatively or additionally, the peer-to-peer application may comprise at least one predicting means configured to determine and create a (consumption or production) prediction e.g. based on provided historical data relating to the past consumption/production of electrical power, (external) forecast data, such as weather data and/or user specifications. Such data may be provided via data feeds and/or the respective peer-to-peer modules assigned to the electrical consumer or producer and/or by other participants of the peer-to-peer network.

According to a further embodiment of the present application, allocating the at least one electrical producer of the part of the electrical producers to the electrical consumer may comprise storing the allocation of the at least one electrical producer of the part electrical producers to the electrical consumer in an inspectable allocation registry storage at least controlled by a peer-to-peer application. For instance, the previously described allocating means may be also configured to store the made allocation of the at least one electrical producer of the part of the electrical producers to the electrical consumer in the inspectable allocation registry storage. For instance, following data related to such an allocation can be stored:

Identifier of the electrical consumer and/or respective electrical consumer entity; Identifier of the at least one electrical producer and/or respective electrical producer entity allocated to said electrical consumer and/or respective electrical consumer entity; Geographic location (e.g. GPS coordinates or the like) of the electrical consumer and/or respective electrical consumer entity; Geographic location (e.g. GPS coordinates or the like) of the at least one electrical producer and/or respective electrical producer entity 106 allocated to said electrical consumer and/or respective electrical consumer entity; (Time dependent) Predicted power produced by the at least one electrical producer and/or respective electrical producer entity and allocated to the electrical consumer; and (Time dependent) Predicted power consumed by the at least one electrical producer and/or respective electrical producer entity and allocated to the electrical consumer.

It shall be understood that only a portion of the previously described data might be stored in the allocation registry storage. The allocation registry storage may be updatable and, in particular, inspectable by at least a part of the participating entities/units of the system. Updatable means, in particular, that data can be changed, deleted or added. Authorization methods for updates might be stored in the registry. Inspectable means, in particular, that other parties can read out data from the allocation registry storage. In particular, the readable data can be displayed by an entity, e.g. the consumer entity, in order to show the power source(s) (currently) used to operate the at least one electrical consumer. Thereby, according to one embodiment, access to the data (preferably stored in encrypted form) can be controlled by the peer-to-peer application, in particular, by an (not shown) access controlling means of the peer-to-peer application.

The allocation registry storage may be at least controlled by the peer-to-peer application. Controlling may include that the allocation registry storage is part of the peer-to-peer application. Alternatively or additionally, an (off-chain) storage arrangement comprising the at least one allocation registry storage can be provided. The (off-chain) storage arrangement may be controlled by the peer-to-peer application. In particular, the access to data stored in the storage arrangement can be controlled by the peer-to-peer application. Preferably, the storage arrangement comprising a plurality of decentral storage units may be formed as a decentral file system (such as IPFS) or a decentral object store (such as storj) or a decentral distributed database (such as BigchainDB) controlled by the peer-to-peer application. Preferably, two or more allocation registry storages can be provided and controlled by the peer-to-peer application in order to avoid manipulations of the data stored.

Furthermore, according to a preferred embodiment of the present application, the method may further comprise controlling the electrical grid at least also depending on the at least one stored allocation of the at least one electrical producer of the part of electrical producers to the electrical consumer. Based on the allocation, potentially load and demand fluctuations can be determined. Further, based on the allocation, the electrical power fed into the electrical grid and/or the electrical power drawn from the electrical grid can be estimated for a future time period. In particular, based on the data stored allocation registry storage the electrical grid can be managed and controlled in order to keep grid voltage and grid frequency (sufficiently) steady preferably without a central instance but by a peer-to-peer application of a peer-to-peer network. Further, nodes comprising sensor(s) for measuring grid parameter(s) (e.g. grid frequency, grid voltage) can be provided. Based on the provided sensor data and based on the allocation data, a grid controlling means of the peer-to-peer application may control the electrical grid, e.g. by instructing controllable load(s) and/or producer(s) to conduct a switching process in order to change the current power draw/supply.

According to a further embodiment, the method may further comprise displaying at least the at least one allocation of the at least one electrical producer to the electrical consumer based on the at least one stored allocation of the at least one electrical producer to the electrical consumer. In particular, at least the identifiers of the electrical producers (currently) used by the electrical consumer can be displayed based on the at least one stored allocation of the at least one electrical producer to the electrical consumer. For instance, by means of a display device (e.g. having a peer-to-peer module configured to access the allocation registry storage via the peer-to-peer application), the stored data can be displayed. For example, for a particular electrical consumer, the electrical producer(s) currently associated (paired) with the electrical consumer may be displayed. This means that the electrical producer(s) can be displayed, from which the electrical consumer is currently receiving its power. For example, the producer identifier (e.g. name) and/or the installation location (e.g. grid connection point) and/or distance to the consumer and/or producer type (e.g. photovoltaic device, biomass plant, wind turbine, etc.) can be displayed. The power value that the producer is currently providing to the consumer can also be displayed. In a simple way, third parties can notice from which producer(s) a consumer is currently receiving its energy.

The allocation of a producer to a consumer may depend on further conditions. In particular, if two or more producers meet the distance condition and may be able to provide more power than required by the consumer during a particular future time period, additional criteria may be used to select one or more of the available producer(s). According to a preferred embodiment, the method may further comprise determining the respective type of each of the electrical producers of the part of the plurality of electrical producers. Allocating the at least one electrical producer of the part of the electrical producers to the electrical consumer may depend on the determined type of the at least one electrical producer. For instance, in the peer-to-peer application, further allocation rules can be set. For instance, specific types of electrical producers (e.g. photovoltaic devices, wind turbines) may have a higher rank than others electrical producers (e.g. biomass plants, gas power plants). Preferably, each type can correspond to a rank number. In addition, allocation may also depend on further criteria, such as an allocating criterion, reputation factor of an electrical producer, etc.

Preferably, the peer-to-peer application may comprise a distance determining means (e.g. in form of a smart contract) configured to determine the distance between an electrical consumer and an electrical producer. Preferably, determining a distance between an electrical consumer and an electrical producer may comprise:
  determining the geographic installation location of the electrical consumer,
  determining the geographic installation location of the electrical producer, and
  determining the distance between the electrical consumer and the electrical producer based on the determined geographic installation location of the electrical consumer and the determined geographic installation location of the electrical producer.

For instance, the geographic installation location (e.g. in form of geographic coordinates) can be provided by a peer-to-peer module of the respective electrical device to the peer-to-peer application. Based on said data, e.g. the distance determining means may determine (calculate) the distance between said electrical devices. For instance, a location parameter data set can be provided to the peer-to-peer application. The location parameter data set can be based on a GPS sensor (or a similar sensor or by analysis of an IP address) of the electrical device (or its entity). It may be also possible that the location parameter data set includes the location parameter(s) of a next transformer station and/or the corresponding meter of a load or producer. Alternatively or additionally, a location parameter data set can be manually input. The distance can be determined with high accuracy and in an easy manner.

Further, it may be possible that the (estimated) power supplied by the one or more producer(s) meeting the above (first) distance condition is not sufficient for the estimated power needed by a specific consumer. According to a further embodiment, the method may further comprise conducting at least one further allocating step if, in the first allocating step, at least the electrical producer(s) cannot be allocated to the electrical consumer such that the determined consumption prediction of the electrical consumer matches to the determined production prediction of the at least one electrical producer and/or such that the determined distance between the electrical consumer and the at least one electrical producer is at least smaller than at least one first distance limit. The further allocating step may comprise allocating at least one of the part of the electrical producers to the electrical consumer such that the determined consumption prediction of the electrical consumer matches to the determined production prediction of the at least one electrical producer and such that the determined distance between the electrical consumer and the at least one electrical producer is at least smaller than at least one further distance limit which is at least larger than the first distance limit. For instance, the first distance limit can be between 3 to 10 km, preferably between 4 to 5 km, and the further distance limit can be between 20 to 100 km, preferably between 30 to 60 km. It shall be understood that three or more distance limits can be provided. By providing two or more distance limits and by ranking said limits as described it can be ensured that electrical producers are allocated to a specific electrical consumer in the order of their distances to said consumer.

Furthermore, the peer-to-peer application may be configured to generate at least one grid allocation transaction agreement. In particular, the at least one allocating step may comprise generating at least one allocation transaction agreement about the allocation of the at least one electrical producer to the electrical consumer by means of the peer-to-peer application. The allocation transaction agreement may comprise at least one of:
  allocating criterion,
  identifier of the at least one electrical producer,
  identifier of the electrical consumer,
  amount of power (and time duration) delivered by the at least one electrical producer, and
  amount of power (and time duration) consumed by the electrical consumer.

The peer-to-peer application may be configured to store a generated allocation transaction agreement. An allocation transaction agreement may be a smart contract. In particular, the allocating means may be at least a part of one or more generated allocation transaction agreement(s) (or vice versa). An allocation transaction agreement may comprise at least one identifier of the consumer and identifier(s) of the one or more producer(s) allocated to said consumer. In addition, one or more cryptographic key(s) needed to communicate with the consumer and/or producer(s) may be stored in the allocation transaction agreement.

Further, at least one allocating criterion may be stored in the grid control transaction agreement. It may be possible that for the allocation of a producer to a consumer as a power provider, the consumer (or its entity and/or provider) has to fulfill one or more allocating criterion/criteria. For instance, the allocating criterion may be a financial value. Financial values can be (instantaneously) exchanged (e.g. between the consumer entity and the respective producer entity) with a transaction via a cryptocurrency. Escrow functionality can be used to mitigate credit risk of transactions. In an alternative or additional embodiment micropayment channels may be used for a (constant) payment stream that can be handled e.g. partly off-chain to reduce the amount of on-chain transactions. In a further embodiment so called state channels or state networks (e.g. Raiden Network, Lightning Network) may be used to exchange digital tokens off-chain in a secure way. Opening and/or closing of state channels may be registered on the peer-to-peer application. This means that individual transactions may not be stored on the peer-to-peer application in order to improve scalability and avoid movement tracking of pseudonyms on the peer-to-peer application. In an embodiment, advanced cryptographic methods may be used to enable anonymous transactions (e.g. zk Proof Systems, Ring Signatures, Mixers, HD Wallets). According to the present application, a man-in-the-middle is not necessary.

The allocation transaction agreement may be an allocation transaction agreement between two or more entities (e.g. the consumer entity and the one or more producer entities or their respective users/operators). The generation of the allocation transaction agreement can be caused or initiated by at least one peer-to-peer module, such as a peer-to-peer module assigned to a consumer or a peer-to-peer module assigned to a producer, for example, by transmitting a request message comprising at least one instruction on the generation of the allocation transaction agreement.

Further data can be included in an allocation transaction agreement. Besides the above power values, data, such as installation location of the involved electrical devices, types of the involved electrical devices, etc. can be stored in the allocation transaction agreement.

In addition to the allocation transaction agreement or as a subpart of the allocation transaction agreement, a power exchange transaction agreement about the power supplied by the at least one producer to the consumer can be generated by the peer-to-peer application. Also such a transaction agreement may be a smart contract. An power exchange transaction agreement can comprise at least one of:
  power exchange criterion,
  identifier of the at least one electrical producer,
  identifier of the electrical consumer,
  amount of power (and time duration) to be delivered by the at least one electrical producer, and
  amount of power (and time duration) to be consumed by the electrical consumer.

Similarly to an allocating criterion, the power exchange criterion may be a financial value to be paid by the consuming entity for consuming power supplied by the electrical producer. For example, one of the consumer and producer entity may cause the generation of a power exchange transaction agreement that the producer supplies the consumer for a specific period of time $T_x$ and an amount X with a given quantity of electrical power (X kW/h) via the electrical grid.

Furthermore, according to an embodiment of the present application, the method may further comprise registering at least one of the electrical consumer and the plurality of electrical producers in the peer-to-peer application by storing at least one identifier assigned to the at least one of the electrical consumer and the plurality of electrical producers. Preferably, all devices (and/or entities) of the system, such as all electrical consumers and/or consumer entities, all electrical producer(s) generally available for an allocation and/or the respective producer entities, all display devices and/or the display entities, etc., may be registered in the peer-to-peer application. For registering one of these devices/entities the method may comprise receiving a registering message by a registering means of the peer-to-peer application from a peer-to-peer module assigned one of the previously described devices/entities. The sending device/entity may be registered in the peer-to-peer application by storing the identifier of the device/entity e.g. in a registry storage (e.g. having identifier list).

The registering means may be configured to register the entity/device by storing a unique (peer-to-peer) identifier. The identifier can be stored in an identifier list. Preferably, the identifier list can be stored in the peer-to-peer application and/or a storage arrangement controlled by the peer-to-peer application. The identifier list can be used by the peer-to-peer application for verifying e.g. a sender of a message. Preferably, each message can comprise an identifier which can be checked by at least part of the nodes based on the identifier list comprising the identifiers of all registered entities/devices. Thereby, the security of any process conducted and/or controlled by the peer-to-peer application can be further increased.

More particularly, an entity (including a user) or a device or the like can be registered in the peer-to-peer application, as e.g. a so called smart asset. Each registered entity/device can be stored with its unique (peer-to-peer) identifier e.g. in one or more identifier list(s) of authorized entities/devices. An identifier of an entity/device might be already a peer-to-peer identifier or another identifier suitable to uniquely identify the entity/device. The unique peer-to-peer identifier may be a serial number or a smart asset hash of e.g. the entity/device, the user's name of the entity, the name of the consumer entity, name of the producer entity, a communication address of an entity/device, a signature, etc. If e.g. an identifier of an entity/device is not already a unique peer-to-peer identifier, e.g. if the identifier is non-unique name of an entity/device, the peer-to-peer application, in particular, the registering means, may be configured to generate an unique peer-to-peer identifier for the respective entity (according to preset rule(s)).

It shall be understood that an entity can be a user registered in the peer-to-peer application. Each registered user can be stored with or linked to its unique (peer-to-peer identifier) e.g. in one or more identifier list(s) of authorized entities. According to an embodiment of the method according to the present invention, a user may authenticate himself at one of the devices, such as a consumer or producer entity.

Prior to the registering of an entity/device (e.g. electrical consumer, electrical producer, etc.), at least part of the nodes (peers) of the peer-to-peer network may check, in particular, by executing the registering means, whether registering requirements (such as specific entity specifications or valid signatures or compliance requirements or installation location within a predefined area) predefined by the peer-to-peer network (and its participants) are met by the entity/device requesting registering. For instance, it may be necessary that an electrical producer meets predefined technical specifications (e.g. a minimum permissible power capability, predefined permissible producer types, etc.). In order to perform the check, preferably, further data may be included in the registering message (such as information about the power capabilities, type of the producer or consumer, information regarding its installation location, etc.). In particular, the peers of the peer-to-peer network may provide registering rules or registering requirements which must be fulfilled by an entity/device to be regarded as a trustful entity/device. Rules/requirements may be individually defined by the peers of a peer-to-peer network. E.g. it may be necessary that a new entity/device must be recommended by an entity/device which is already a participant of the peer-to-peer network. In addition, it may be necessary that this participant must have a reputation factor which increases a predefined minimum reputation factor. For instance, if an entity/device has a low reputation factor e.g. due to detected non-payment of (some) invoice(s), the entity/device may not be registered by the registering means. During the registering process, the location of the entity/device to be registered can be determined, as described above. Preferably, all data related to an entity/device can be stored in the registry storage. For instance, following data can be stored: identifier of the entity/device, power capabilities, type of the entity/device, geographic location, reputation factor, etc.

According to a further preferred embodiment, the at least one peer-to-peer application can be a decentralized register or a shared database configured to store data, e.g. allocation transaction agreement(s), identifier(s), made allocation(s), etc., with given certain proofs or signatures. In addition to e.g. identifiers, the decentral register can store computer code acting as e.g. allocating means, forecasting means, registering means, or the like. In particular, the code can be invoked by a transaction to the address of the code in so called smart contracts. This code can be processed on the plurality of node(s) of the peer-to-peer network.

Further, an optimizing means can be provided and may include algorithm(s) for de-central cognitive analytics, artificial intelligence, neural networks, or machine learning. Analytics and learning can be shared with other devices, aggregated and further analyzed via the peer-to-peer applications e.g. in order to improve the allocating step(s), grid controlling step(s) or the like.

A decentralized register can be readable at least by a part of the participants of the peer-to-peer network. In particular, every computer node and each registered entity/device (by means of the respective peer-to-peer module) can comprise the peer-to-peer application. The decentralized register, at least its public part (i.e. may be without private contracts), may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application.

A message or transaction sent to a smart contract may start the execution of a code of the smart contract (e.g. registering means, allocating means, access controlling means, optimizing means, etc.) while using data stored in the smart contract. For instance, sending at least one allocation request message from a consumer to an allocating means may start the execution of the code resulting in e.g. initiating allocation of one or more producer(s) to said consumer, as described hereinbefore.

The peer-to-peer application can be built upon the following elements: peer-to-peer network comprising Consensus System and/or Protocol, Data Structure, Merkle Trees, Public Key Signatures, Byzantine Fault Tolerance. It may replicate data based on a consensus principle. It may be auditable and traceable.

In a simple way, information can be made available to preferably all participants. This may allow to carry out a review of the information stored in the decentral register or the code executed in the decentral register. Particularly preferably, each computer (node) in the peer-to-peer network can be configured to review new information, in particular, based on older information stored in the peer-to-peer application. In addition, the at least one controlling means may be monitored by at least a part of the nodes of the peer-to-peer network, preferably by all nodes. A manipulation of an allocating means can thus be prevented, at least detected.

Moreover, at least a plurality of nodes, preferably each node can in each case comprise the complete data content, but include at least a portion of the data contents of the peer-to-peer application, in particular of the decentral register. For example, it may be provided that after a positive verification of written information or e.g. a positive registering in the peer-to-peer application this information is saved by all nodes, at least by a part of the computers. For instance, after the generation of an allocation transaction agreement and/or after a successful registering, the agreement and (new) identifier, respectively, can be stored at least by a part, preferably all nodes of the peer-to-peer network. The tamper resistance of the data stored in the peer-to-peer application can thereby be further improved. Each action/process/step can be securely controlled.

In order to store new information in a tamper-proof way, the peer-to-peer application can comprise encryption means and/or signature means and/or verification means, wherein at least one of the encryption means and/or signature means and/or verification means is configured to store data, such as an allocation transaction agreement (s), identifier(s), location data, allocations, etc. In particular, it can be provided that by the hash function a link is established with at least one previously stored information in the decentral register. Further data, such as request messages, ordinary, contextual and/or transaction data of an entity/device, such as an electrical consumer or an electrical producer, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present method, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, allocation processes can be improved by using the block chain in order to control the allocating process. Thereby, due to the block chain, the allocation process can be securely performed. E.g. an allocating means can be easily implemented as a smart contract in a block chain.

In addition, the block chain can be used to generate predefined action(s) caused by at least one peer-to-peer module and/or an allocating means in a tamper-proof manner. The block chain according to the present embodiment is particularly a decentralized, peer-to-peer-based register in which all data related to at least one allocating process can be logged. A block chain is particularly suitable as a technical means to replace a central entity/server in a simple and secure manner.

In further embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms, such as side chains or smart contracts. A peer-to-peer node can run one or more different block chain client (s).

Data of the peer-to-peer application, such as data related to an electrical producer or electrical consumer, can be stored on the "decentral ledger technology" and/or the decentral ledger steers (encrypted) data storage arrangements (e.g. comprising one or more component storage(s)) accessible via the internet and preferably in de-central data storage arrangement, object store and database, respectively, such as Interplanetary File System (IPFS) or storj or in a distributed Blockchain database (e.g. BigChainDB). Access to encrypted data to third party entities is managed via the access control means formed as one or more smart contract(s) on the block chain.

In addition, data feeds can be provided by the peer-to-peer application (so called "smart oracles"). Data feeds can provide further data relating to e.g. a prediction action for creating a consumption or production prediction from at least one further source. For instance, further weather environmental data or the like can be provided by a meteorological provider or the like. Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the first peer-to-peer module of an electrical producer, the further peer-to-peer module of an electrical consumer, etc. A peer-to-peer module may be only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a controlling process and one or more observing (or monitoring) node(s). An observing node can validate transactions to establish a trust level but does not validate all transactions which is done by the validating peer.

In a further embodiment, the peer-to-peer module is one of the nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as forecasting data, etc., via the API. The decentral application so called "Dapp" is at least configured to process and transmit said data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure hardware enclave for attestation and sealing that cannot be manipulated by other software code running on the devices. In an alternative embodiment, secure Multi-Party-Computing (sMPC) systems can be used for transactional privacy. Examples for privacy preserving protocols and computation are HAWK and MIT Enigma. Preferably, the optimizing means can be formed by one of these techniques.

With zero knowledge proof (zk Proofs) the parties can see that the algorithm is executed correctly in a private contract, but the input data are not disclosed to the party. In addition, selective privacy can be achieved by sharing keys to decrypt transactions for reporting and auditing purposes.

To securely deploy code and or data into a device a trusted execution environment, such as Intel SGX or TPM or Direct Anonymous Attestation module, can be integrated with a peer-to-peer module.

Similarly, in a further embodiment, a particularly large peer-to-peer network may be divided in two or more (physical or logical or dynamically virtual) cluster(s). In a corresponding peer-to-peer network, for example, a validation (of a subset of transactions) may only be carried out by the members of one cluster (a subset of nodes; e.g. sharding of a block chain to improve the scalability). In a further embodiment, the peer-to-peer application can be formed using multiple block chains. These block chains are connected via frameworks such as sidechains or smart contracts.

A further aspect of the present application is a peer-to-peer application for a peer-to-peer network. The peer-to-peer application comprises at least one allocating means configured to allocate at least one electrical producer of a part of the electrical producers of an electrical grid to at least one electrical consumer of the electrical grid in a first allocating step such that a consumption prediction of the electrical consumer matches to the production prediction of the at least one electrical producer and such that a distance between the electrical consumer and the at least one electrical producer is at least smaller than at least one first distance limit.

In particular, the peer-to-peer application can be configured to conduct at least a part of the previously described method steps. Preferably, further means in form of e.g. smart contracts can be provided. For instance, the peer-to-peer application can comprise one or more of the following means:
- at least one distance determining means configured to determine a distance between an electrical consumer and an electrical producer,
- at least one previously described access controlling means,
- at least one previously described registering means,
- at least one previously described grid controlling means,
- at least one previously described optimizing, and
- at least one previously described prediction means.

A still further aspect of the present application is a system for operating an electrical grid comprising at least one electrical consumer, a plurality of electrical producers, and at least one peer-to-peer network with at least one previously described peer-to-peer application. The system can be, in particular, operated in accordance with the above described method.

According to one embodiment of the system according to the present application, the system may further comprise at least one peer-to-peer module assigned to the electrical consumer and configured to provide at least one (time dependent) consumption prediction for the electrical consumer to the peer-to-peer application (as previously described). Alternatively or, preferably, additionally, the system may comprise at least one further peer-to-peer module assigned to the electrical producer and configured to provide at least one (time dependent) production prediction for the electrical producer ( ) to the peer-to-peer application (as previously described).

It shall be understood that if the actually supplied power and/or the actually consumed power differs from the estimated power exchange (according to a made allocation), in a subsequent accounting step, the difference can be included and compensated (e.g. in accordance with a generated power exchange transaction agreement).

The features of the methods, systems, peer-to-peer modules, peer-to-peer applications, and computer programs can be freely combined with one another. In particular, features of the description and/or the dependent claims, even when the features of the dependent claims are completely or partially avoided, may be independently inventive in isolation or freely combinable with one another.

BRIEF DESCRIPTION OF THE DRAWING

These and other aspects of the present patent application become apparent from and will be elucidated with reference to the following figures. The features of the present application and of its exemplary embodiments as presented above are understood to be disclosed also in all possible combinations with each other. In the figures show

DETAILED DESCRIPTION

Figure 1:
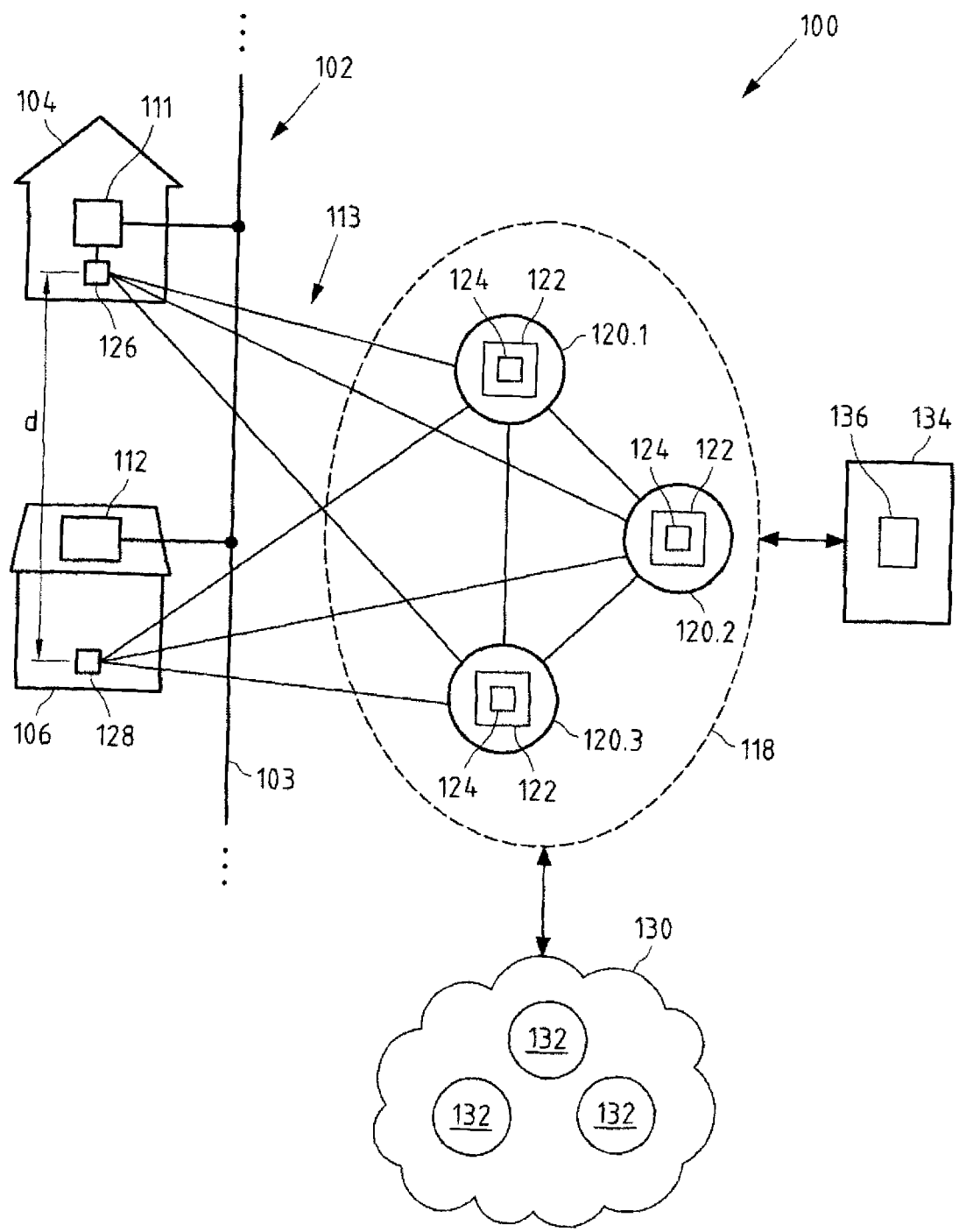
FIG. 1 depicts a schematic view of an embodiment of a system according to the present application.

Like reference numerals in different figures indicate like elements.

FIG. 1 shows a schematic view of an embodiment of a system 100 according to the present application. The system 100 is configured to operate an electrical grid 102 having a plurality of electrical producer entities 106 and at least one electrical consumer entity 104. For sake of clarity, only one power line 103 of the electrical grid 102 and only one producer entity 106 of a plurality of producer entities 106 are depicted.

A producer entity 106 comprises at least one electrical producer 112. In particular, the electrical producer 112 may use a renewable resource for producing electrical energy. In the present example, the electrical producer 112 is a photovoltaic device 112. Generally, examples of electrical producers 112 include photovoltaic devices, wind turbines, biomass plants, hydroelectric power plants, gas power plants, etc.

The depicted consumer entity 104 comprises at least one electrical consumer 111 and load 111, respectively. Non-exhaustive examples of loads 111 are cooling houses, compressed air generators, hydraulic systems, climatic chambers, electrical vehicles, and the like.

It shall be understood that a consumer entity might comprise two or more electrical consumers and that a producer entity might comprise two or more electrical producers. It shall be further understood that a consumer entity might also comprise one or more electrical producer(s) and that a producer entity might also comprise one or more consumer(s). Such entities might be called prosumers.

A substantial difference compared with prior art techniques is that no central instance and/or third party organization is provided. In the present case, the system 100 comprises a peer-to-peer network 118 and computer-computer network 118, respectively. The peer-to-peer network 118 comprises a plurality of nodes 120.1, 120.2, 120.3 and computers 120.1, 120.2, 120.3, respectively. A peer-to-peer network 118 is characterized in the present case in that each node 120.1, 120.2, 120.3 and/or participant 126, 128 is preferably connectable at least to every other node 120.1, 120.2, 120.3 and/or participant 126, 128.

For instance, at least one physical standard communication network 113 (wired and/or wireless) can be used for connection. For communicating via the at least one physical standard network 113 suitable transceiver modules may be arranged in the respective entities/devices. For instance, the Internet can be used for communication.

In addition, the nodes 120.1, 120.2, 120.3 have equal rights, something which distinguishes them from a server-client structure.

The depicted nodes 120.1, 120.2, 120.3 (each) comprise a peer-to-peer application 122. As can be seen from FIG. 1, the same peer-to-peer application 122 is preferably implemented on each node 120.1, 120.2, 120.3. This means, in particular, that the same (data) content is comprised on each node 120.1, 120.2, 120.3 and that the same code (e.g. allocating means 124 in form of a smart contract, etc.) is executed on each node 120.1, 120.2, 120.3.

The peer-to-peer application 122 may preferably be a public register 122 or a decentral ledger 122 that can, in particular, be inspected by all participants 120.1, 120.2, 120.3, 126, 128 (not only the nodes 120.1, 120.2, 120.3) of the peer-to-peer network 118. Each node 120.1, 120.2, 120.3 preferably has the (entire) public register 122. It may also be envisaged that only part of the register can be provided on a node (light node). In a particularly preferred embodiment, the peer-to-peer application 122 may be a block chain 122 which will be explained in more details hereinafter. It shall be understood that the peer-to-peer network may comprise further nodes. In addition, it shall be understood that also a consumer entity and/or producer entity can be formed as a node of the peer-to-peer network.

The peer-to-peer network 118 is, in particular, configured to provide an automatic allocation of locally neighbored electrical consumers 111 and electrical producers 112. In particular, the peer-to-peer application 122 may comprise an allocating means 124. The allocating means 124 is implemented on all nodes 120.1, 120.2, 120.3. In the present example, in order to conduct at least one (first and/or further) allocating step, the allocating means 124 is executed by all nodes 120.1, 120.2, 120.3 (comprising said allocating means 124).

The allocating means 124 is configured to allocate one or more of the producer(s) 106 of e.g. a part of the overall available producers 106 to at least one consumer 104 such that the power expected to be generated by the one or more producer(s) 106 during a specific future time period is equal to the power expected to be consumed by the consumer 104 during said specific future time period. In other words, at least one electrical producer 112 of a part of the overall electrical producers 112 is allocated to (and paired with, respectively) the electrical producer 111 in a first allocating step such that the determined consumption prediction of the electrical producer 111 matches to a determined (sub) production prediction of the at least one electrical producer 112.

Thereby, the above described allocation (pairing) of at least one electrical producer 112 of the part of the electrical producers 112 to the electrical producer 111 in a first allocating step is conducted such that the geographic distance d between the electrical producer 112 and the electrical producer 111 is (must be) smaller than a first distance limit $d_{lim}$ ($d < d_{lim}$). For instance, the first distance limit $d_{lim}$ may be between 4 and 5 km. Other limit values are possible. For instance, the limit can define a particular area, such as the area of a specific town, district or the like.

The allocating means 124 may be also configured to store the made allocation of the at least one electrical producer 112 of the part of the electrical producers 112 to the electrical producer 111 in an inspectable allocation registry storage. For instance, following data related to such an allocation can be stored:

Identifier of the electrical producer 111 and/or respective electrical consumer entity 104, Identifier of the at least one electrical producer 112 and/or respective electrical producer entity 106 allocated to said electrical producer 111 and/or respective electrical consumer entity 104, Geographic location (e.g. GPS coordinates or the like) of the electrical producer 111 and/or respective electrical consumer entity 104, Geographic location (e.g. GPS coordinates or the like) of the at least one electrical producer 112 and/or respective electrical producer entity 106 allocated to said electrical producer 111 and/or respective electrical consumer entity 104, (Time dependent) Predicted power produced by the at least one electrical producer 112 and/or respective electrical producer entity 106 and allocated to the electrical consumer, (Time dependent) Predicted power consumed by the at least one electrical producer 112 and/or respective electrical producer entity 106 and allocated to the electrical consumer.

It shall be understood that only a portion of the previously described data might be stored in the allocation registry storage. The allocation registry storage may be updatable and, in particular, inspectable by at least a part of the participating entities/devices of the system 100. Updatable means, in particular, that data can be changed, deleted or added. Authorization methods for updates might be stored in the registry. Inspectable means, in particular, that other parties (such as a display entity 134) can read out data from the allocation registry storage. In particular, the readable data can be displayed by a display device 136 of a display entity (the display entity may be a part of the consumer entity), in order to show the power source(s) (currently) used to operate the at least one electrical consumer 111. A (not shown) peer-to-peer module may be assigned to the display device (or its entity) and may be configured to communicate with the peer-to-peer application in order to receive the at least the data to be displayed. Thereby, according to one embodiment, access to the data (preferably stored in encrypted form) can be controlled by the peer-to-peer application 122, in particular, by an (not shown) access controlling means of the peer-to-peer application 122.

The allocation registry storage may be at least controlled by the peer-to-peer application 122. For instance, the allocation registry storage can be a part of the peer-to-peer application 122. Alternatively or additionally, a (off-chain) storage arrangement 130 comprising the at least one allocation registry storage can be provided. The (off-chain) storage arrangement 130 may be controlled by the peer-to-peer application 122. In particular, the access to data stored in the storage arrangement 130 can be controlled by the peer-to-peer application 122. Preferably, the storage arrangement 130 comprising a plurality of decentral storage units 132 may be formed as a decentral file system (such as IPFS) or a decentral object store (such as storj) or a decentral distributed database (such as BigchainDB) controlled by the peer-to-peer application 122.

In the present case, the peer-to-peer modules 126, 128 are not nodes of the peer-to-peer network 118 but only participants 126, 128. While nodes 120.1, 120.2, 120.3 in the peer-to-peer network 118 comprise at least a part of the peer-to-peer application 122 itself, a participant of a peer-to-peer network 126, 128, like the present peer-to-peer modules 126, 128, does not comprise the peer-to-peer application 122. Such a peer-to-peer module 126, 128 is configured to provide (only) access to the peer-to-peer application 122 e.g. via an API (application programming interface). Each peer-to-peer module 126, 128 (also a node or light node) may comprise a decentral application and at least an API.

In the case, the peer-to-peer module is formed as a node of the peer-to-peer network the peer-to-peer module (also) comprises at least partly the peer-to-peer application 122. It shall be understood that a peer-to-peer module 126, 128 might be a node of the peer-to-peer network 118. It shall be understood that a peer-to-peer module 126, 128 may have access or may be connected to a "gateway" running a node of the peer-to-peer network.

Figure 2:
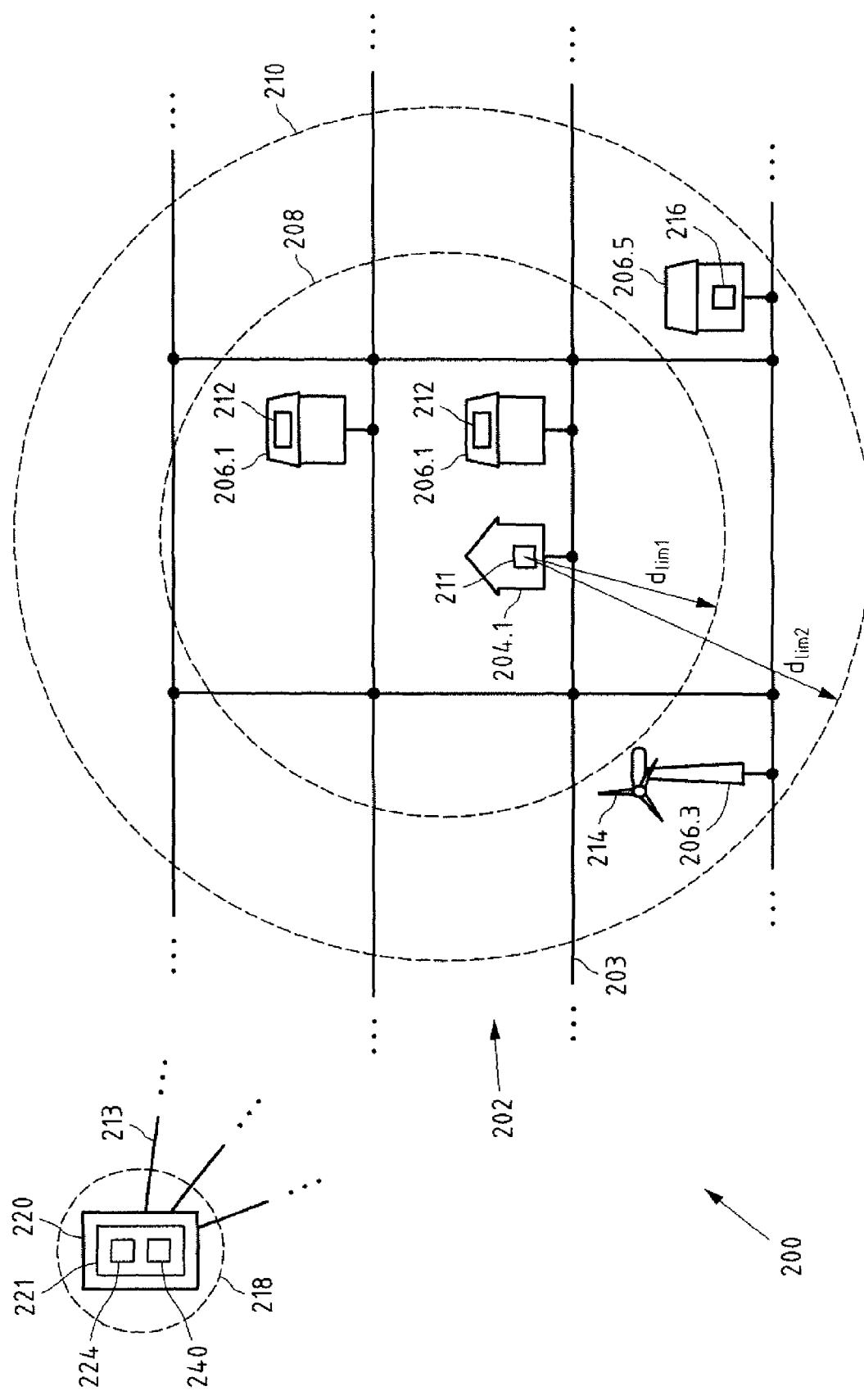
FIG. 2 depicts a schematic view of a further embodiment of a system according to the present application.

FIG. 2 shows a further schematic view of an embodiment of a system 200 according to the present application. The system 200 comprises an electrical grid 202 with a plurality of power lines 203. A plurality of electrical devices 211, 212, 214, 216 are at least connectable with the power lines 203. Further, a peer-to-peer network 218 comprising a plurality of nodes 220 is provided. For the sake of clarity, only one of the plurality of nodes is depicted. Furthermore, for sake of clarity, peer-to-peer modules assigned to the respective electrical devices and also their connections 213 with the peer-to-peer network 218 are not depicted. In the present example, the peer-to-peer application 222 comprises at least one allocating means 224 and at least one distance determining means 240.

Figure 3:
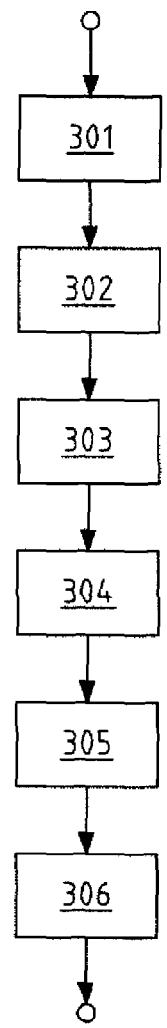
FIG. 3 depicts a diagram of an embodiment of a method according to the present application.

The functioning and operation of the system 200 according to FIG. 2 will be elucidated in more details with the aid of FIG. 3. FIG. 3 shows a diagram of an embodiment of a method according to the present application.

In a first step 301, at least one consumption prediction for the electrical consumer 211 (e.g. a cooling device 211) of the consumer entity 204.1 can be provided. For instance, the electrical consumer 211 (or its entity 204.1) may determine and create the (time dependent) consumption prediction e.g. by using a (not shown) controlling unit. For instance, based on historical consumption data, calendar data (e.g. winter or summer, working day or non-working day, etc.), operator specifications, weather forecast data (e.g. estimated temperature), the controlling unit may create the consumption prediction (e.g. in form of an estimated time dependent load profile) for a future time period, such as the next x day(s) and/or next x week(s) and/or next x minute(s). The created consumption prediction can be transmitted to the peer-to-peer application 222 by means of a peer-to-peer module at least connectable to the controlling unit. For instance, this process can be conducted each day for each next day.

In a further step 302, preferably, for each of the electrical producers 212, 214, 216 (registered in the peer-to-peer application 222) a respective (individual) (sub) production prediction can be provided. By way of example, an electrical producer 206.1, 206.2, 206.3, 206.4 (or its entity 206.1 to 206.5) may determine and create the (time dependent) consumption prediction e.g. by using a respective (not shown) controlling unit. For instance, based on historical production data, calendar data (e.g. winter or summer, working day or non-working day, etc.), operator specifications, weather forecast data (e.g. temperature, wind speed, etc.), the controlling unit may create the production prediction (e.g. in form of an estimated time dependent production profile) for a future time period, such as the next x day(s) and/or next x week(s) and/or next x minute(s). The created production prediction can be transmitted to the peer-to-peer application 222 by means of a peer-to-peer module at least connectable to the respective controlling unit. For instance, this process can be conducted each day for each next day. It shall be understood that steps 301 and 302 can be conducted in different order and/or in parallel.

In step 303, the respective distances between said electrical consumer 211 and the available electrical producers 212.1, 212.2, 214, 216 are determined. For instance, based on the respective location data of said electrical devices 211, 212.1, 212.2, 214, 216 stored in a registry storage (e.g. identifier list), the distance determining means 240 may determine the respective distances $d_n$.

It shall be understood that step 303 can be done prior to or parallel to steps 301 and/or 302. In particular, step 303 can be conducted during a registration of a new electrical producer and/or consumer. The determined distances can then be stored in a distance table at least controlled by the peer-to-peer application 222. For an allocating step, the allocating means 224 may access the data stored in the distance table. The distance table may be stored in the peer-to-peer application 222 and/or a (not shown) storage arrangement controlled by the peer-to-peer application 222.

In the next step 304, the allocating means 224 may allocate one or more of the electrical producer(s) 212.1, 212.2, 214, 216 to the electrical consumer 211. The first allocating step is conducted according to predefined allocating rules. In the first allocating step, only producers 212.1, 212.2 having a distance $d_n$ to the consumer 211 which is smaller than a first distance limit $d_{lim1}$ (e.g. $d_{lim1}$=4.5 km) can be allocated to the consumer 211. The outer border of the area corresponding to said first distance limit is indicated by reference sign 208. As can be seen from the present example, two electrical producers 212.1, 212.2 meet this condition.

Further, allocating, in particular, includes allocating the at least one electrical producer 212.1, 212.2 to the electrical consumer 211 in the first allocating step such that the determined consumption prediction of the electrical consumer 211 matches to at least one determined (sub) production prediction of the at least one electrical producer 212.1, 212.2. This may comprise allocating one or more electrical producer(s) 212.1, 212.2 to the consumer 211 such that the power expected to be generated by the one or more electrical producer(s) during a specific future time period is essentially equal to the power expected to be consumed by the electrical consumer during the specific future time period. If the electrical producer(s) 212.1, 212.2 is/are capable to provide power which is larger or equal to the power required by the consumer 211 during a specific future time period, the producers 212.1, 212.2 are allocated to said consumer 211. If, after this allocation, a producer 212.1, 212.2 is still capable of providing power (according to a further (sub) production prediction) to other (not shown) consumers, this producer 212.1, 212.2 can be additionally allocated to one or more other consumer(s).

Further, it may be possible that the (estimated) power supplied by the producer(s) 212.1, 212.2 meeting the above distance condition is not sufficient for the estimated power needed by the specific consumer 211 during a particular future time period. In such a case, at least one further allocating step can be conducted by the allocating means 224. In particular, in the further allocating step, only electrical producers 212.1, 212.2, 214, 216 having a distance $d_n$ to the consumer 211 which is smaller than a further distance limit $d_{lim2}$ (e.g. $d_{lim2}$=50 km) can be allocated to the consumer 211. The outer border of the area corresponding to said further distance limit is indicated by reference sign 210. If it is detected that either producer 214 (a wind turbine) or producer 216 (gas turbine) is capable of providing the still needed power, the allocation may e.g. depend on the type of producer 214, 216. For instance, a wind turbine 214 may have a higher rank than a gas turbine 216, and thus, may be allocated to the consumer 211. The allocation may also depend on other conditions, such as an allocating criterion or the like. For instance, the producer with the lower allocating criterion (e.g. lower financial value) can be used.

It shall be understood, that the allocation can be done for a plurality of electrical consumers. Thereby, an electrical producer may be allocated to two or more electrical consumers at the same time.

In a next step 305, allocating can comprise storing the made allocation(s) in an inspectable allocation registry storage, as described above. In this step, also a previously described allocation transaction agreement can be generated by the peer-to-peer application 222. The created allocation data can be displayed in a further step 306, as described above.

Figure 4:
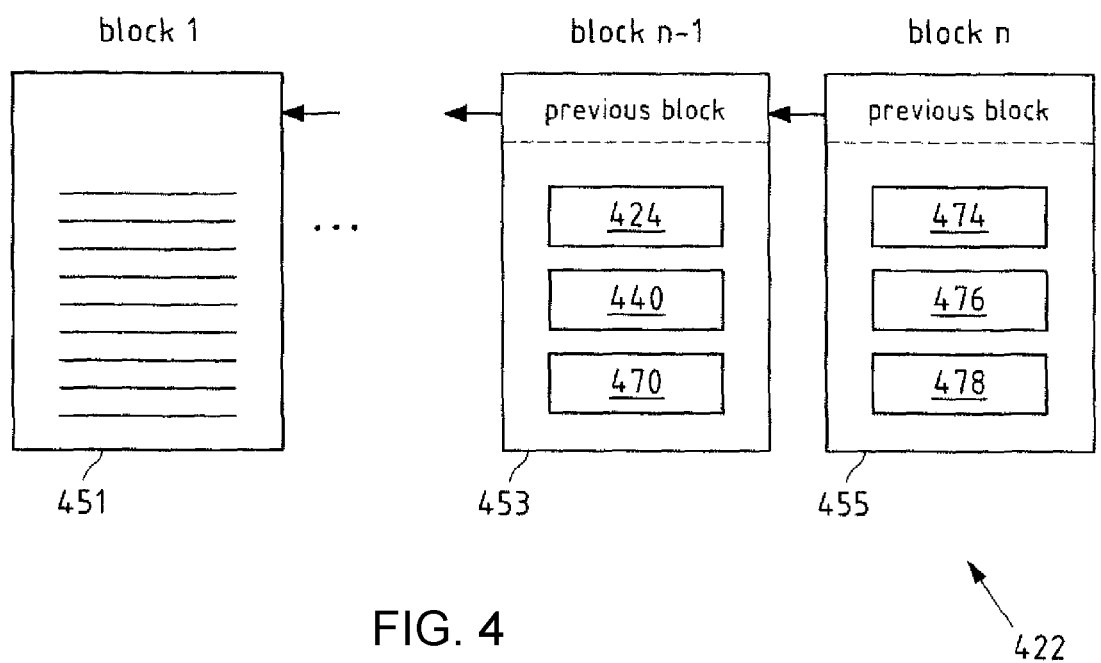
FIG. 4 depicts a schematic view of an embodiment of a peer-to-peer application according to the present application.

FIG. 4 shows a schematic view of an embodiment of a peer-to-peer application 422 according to the present invention.

The depicted peer-to-peer application 422 is a register or distributed ledger readable, in particular, by the participants of the peer-to-peer network. Thereby, data e.g. in form of messages can be written and/or read into/from the register 422 by a peer-to-peer module assigned to an entity/device of the system (e.g. system 100, 200) and/or any other participants in the peer-to-peer network. In a preferred embodiment, the peer-to-peer application 422 may be a block chain 422.

Hereinafter, it is assumed in the following description of the present embodiment that the at least one peer-to-peer application 422 is a block chain 422. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application, the block chain can be a permissionless or permissioned block chain. In a specific case the block chain can be public, consortium or private block chain.

In a further embodiment, the peer-to-peer application can be formed with multiple block chains which are connected via mechanisms, such as side chains or smart contracts. Interoperability among block chains can be established.

The block chain 422 is formed by at least one block 451, 453, 455, preferably by a plurality of interconnected blocks 451, 453, 455. The first block 451 may also be called genesis block 451. As can be seen, a block 453, 455 (except for the first block 451) refers to each previous block 451, 453. A new block can be created by a computationally intensive process (for example, so called "mining" or through another appropriate process, such as voting) and will be particularly provided to all participants of the peer-to-peer network. In a further embodiment a (centrally controlled) master node or a set of master nodes may be configured to create new blocks and/or validating transactions. All other nodes can be validation nodes only.

The present block chain 422 is particularly adapted to receive messages, such as messages comprising consumption prediction(s), production prediction(s), data related and/or needed for creating a consumption or production prediction, registering information, location information, etc., from a peer-to-peer module of a previously described entity/device, (off-chain) computing entity or from another peer-to-peer device/unit of another participant of the peer-to-peer network. Further, the block chain 422 is particularly adapted to save these messages in the block chain 422. Furthermore, the block chain 422 is configured to generate messages e.g. based on a consumption or production prediction, a registering information or like and/or caused by a peer-to-peer module and/or the execution of code of e.g. a distance determining means 440, an allocating means 424, a registering means 478, or the like. In particular, the block chain 422 is at least configured to control and manage an electrical grid by allocating producer(s) to consumer(s) and using said allocation(s) for controlling the grid frequency and/or grid voltage.

In particular, a (newly) received message can be saved and published in the current block 455 of the block chain 422. Due to the configuration of a block chain 422 as a public register 422, said data message of e.g. a peer-to-peer module can be read by preferably all participants of the peer-to-peer network. Alternatively or additionally, data of a message may be stored on a central file service, a decentral file service or distributed block chain database (e.g. storage arrangement 130) controlled by the block chain 422.

As already described, in the present block chain 422 different types of messages and data sets, respectively, for example, within a smart contract (algorithm and/or storage at the block chain 422) can be processed and/or stored. In the present example, the block chain 422 comprises an allocating means 424 in form of a smart contract 424. As previously described, the allocating means 424 can be configured to at least control and conduct the first and/or a further allocating step.

Furthermore, in the block chain 422 one or more allocation transaction agreement(s) 470 (and/or previously described power exchange transaction agreement(s)) may be stored. An allocation transaction agreement 470 may be generated between two (or more) entities/devices (e.g. a producer allocated to a consumer) in order to define the details of a (temporarily) allocation of one or more producer(s) to a consumer. An example of a generation of such an allocation transaction agreement 470 will be described in the following:

An allocation transaction agreement 470 may comprise at least one of the following data:

Identifier(s): One or more identifier(s) of the involved entities/devices, such as an identifier(s) of the electrical consumer(s), identifier(s) of the allocated producer(s), etc.
- Allocating criterion: Criterion that must be fulfilled (in particular, by the consumer) for allocating a producer to a consumer portion
- Allocated amount of power: Amount of power to be delivered by the at least one electrical producer and/or amount of power to be consumed by the electrical consumer
- Key(s) Information about the key(s) used for communication
- Allocation detail(s): Further detail(s) about the allocation (e.g. time duration, registering rule(s))

The allocating criterion may be e.g. an amount of cryptocurrency e.g. per allocating action or per duration of the allocation or per allocated power or a flat amount which has to be transferred prior to, during and/or after one or more allocation step(s)/action(s). The allocating criterion may be a dynamically changeable value e.g. depending on a current or estimated grid status and/or the like.

Preferably, at least a part of the agreed amount of cryptocurrency can be locked by the peer-to-peer application 422 prior to an allocation action/process. In an embodiment, the allocating criterion may be a payment channel for streaming small amounts of crypto tokens per each time and/or data unit. It shall be understood that other transaction criteria and further information can be included in an allocation transaction agreement 470. More information/criteria can be, for example, a time stamp, an ID of the transaction and the like.

In order to generate an allocation transaction agreement 470, for example, a peer-to-peer module assigned to an electrical consumer and consumer entity, respectively, can transmit an allocating request message 474 to the peer-to-peer application 422. The allocating means 424 can conduct the allocation process by pairing said request with a corresponding response message 476 e.g. of a peer-to-peer module assigned to an electrical producer and producer entity, respectively. In other words, request and response (acceptance) messages can be exchanged via the peer-to-peer application 422. The allocating means 424 may control this process e.g. additionally based on the respective predictions and the respective distances between said electrical devices. A request message may comprise indications about the above data (identifiers, allocating criteria, etc.).

For instance, a requesting electrical consumer can send by a peer-to-peer module a request message 474 to the peer-to-peer application 422 comprising data, such as an identifier assigned to the requesting device, desired amount of power during a future time period, its location and/or at least one desired (maximum) allocating criterion. It may be also possible that at least a part of the data can be obtained from a registry storage.

Another message 476 may be an acceptance message 476 of e.g. one or more electrical producer(s). An acceptance message 476 may comprise identical or at least similar data details as compared with a request message 474. It may be also possible that at least part of the data can be obtained from a registry storage. Additionally, the acceptance message 476 can comprise a reference indication to a previous message, such as the ID of the message 474. The acceptance message 476 can be provided by a further peer-to-peer module of an electrical producer or by the peer-to-peer application (e.g. according to preset rules).

If, for example, the acceptance message 476 comprises a higher or other allocating criterion and/or other desired allocating details, the acceptance message 476 can be called a counter-offer message. This can be accepted by the peer-to-peer module of the requesting consumer through an acceptance message. Based on this a peer-to-peer module of an entity/device may cause the generation of an allocation transaction agreement 470 about one or more allocations, as previously described.

In particular, there can be multiple request messages and/or accepting messages. Each entity/device can give guidelines, according to which at least one allocating transaction agreement 470 or other agreements can be generated. In a preferably automated, such as iterative, process each request message can be associated to an optimally corresponding acceptance message. The block chain 422 may be configured to generate, based on the messages of a peer-to-peer module, an allocation transaction agreement 422. In a similar way, a power exchange transaction agreement can be generated.

The access to at least one stored allocation can be controlled by an (not shown) access controlling means e.g. in form of a smart contract, as described hereinbefore.

Moreover, a block chain 422 may comprise a registering means 478 configured to register a (new) entity/device, e.g. an electrical consumer, an electrical producer, a display entity etc., in the block chain 422 as a smart asset.

Figure 5:
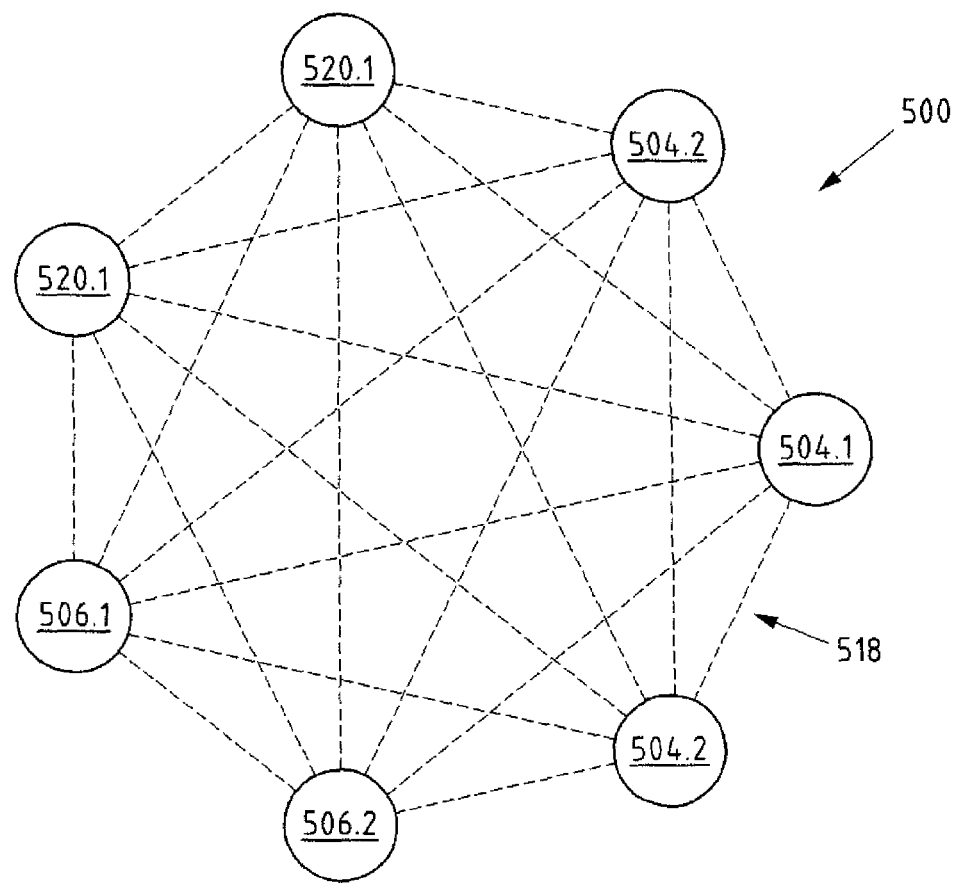
FIG. 5 depicts a schematic view of a further embodiment of a system according to the present application.

FIG. 5 shows a schematic view of another embodiment of a system 500 of the application. In the present embodiment, only nodes and participants 504.1, 504.2, 506.1, 506.2, 520.1 of the peer-to-peer network 518 are shown. In the present example, it is assumed that all nodes participants 504.1, 504.2, 506.1, 506.2, 520.1 comprise the peer-to-peer application (not shown).

The nodes 504.1, 504.2 may correspond to electrical consumers and e.g. may be formed by the respective peer-to-peer modules assigned to said electrical consumers. The nodes 506.1, 506.2 may correspond to electrical producers and e.g. may be formed by the respective peer-to-peer modules assigned to said electrical producers. Nodes 520.1 may be other nodes. It shall be understood that nodes can be full, remote or light nodes.

As can be seen, two different types of peers or node computers 504.1, 504.2, 506.1, 506.2, 520.1 are presently illustrated. All peers 504.1, 504.2, 506.1, 506.2, 520.1 are comprised by the peer-to-peer network 518. In the present embodiment, however, only a part of the peers 504.1, 504.2, 506.1, 506.2, 520.1 in the present case, the peers (nodes)

504.1, 506.1, 520.1 check the validity of e.g. an allocating process, an access process, a distance determining process, a registering process and/or further data stored in the peer-to-peer application or a data storage controlled by the peer-to-peer application, such as agreements, predictions, data sets and the like.

Furthermore, only a part of the entire peers can be configured to store the peer-to-peer application and/or only a part of the peers can be configured to execute the algorithms of a smart/private contract. Since the validation/verification of e.g. identification data requires a considerable computational effort, it may be advantageous for reasons of efficiency, if only a part of the peers 504.1, 506.1, 520.1, especially particularly powerful peers 504.1, 506.1, 520.1 perform the validation and/or controlling algorithms.

Validation, analytics and optimizing can be done on-chain or off-chain, as described hereinbefore. Off-chain validation and/or optimizing can be managed by the peer-to-peer application, like the code on the block chain. Powerful means in particular a high computing power. In other words, in the present case a valid entry in the peer-to-peer application, such as a block chain, is assumed if (only) a part of the peers 504.1, 506.1, 520.1 comes to a positive result. It shall be understood that only a single, especially particularly powerful peer can perform the validation, analytics and/or optimizing process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharding of a block chain to improve the scalability). In a further embodiment, the peer-to-peer application can be formed using multiple block chains. These block chains are connected via frameworks, such as sidechains or smart contracts or interlegder.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of operating an electrical grid having at least one electrical consumer and a plurality of electrical producers, the method comprising:
   providing at least one consumption prediction for the electrical consumer,
   providing respective production predictions for each electrical producer of at least a part of the plurality of electrical producers,
   determining respective distances between the electrical consumer and each electrical producer of the part of the plurality of electrical producers,
   allocating at least one electrical producer of the part of the electrical producers to the electrical consumer in a first allocating step such that the provided consumption prediction of the electrical consumer matches to the provided production prediction of the at least one electrical producer and such that the determined distance between the electrical consumer and the at least one electrical producer is at least smaller than at least one first distance limit to provide distance optimization between the electrical consumer and the at least one electrical producer,
   conducting at least one further allocating step if, in the first allocating step, at least the electrical producers cannot be allocated to the electrical consumer such that the determined consumption prediction of the electrical consumer matches to the determined production prediction of the at least one electrical producer and/or such that the determined distance between the electrical consumer and the at least one electrical producer is at least smaller than at least one first distance limit,
   wherein the second allocating step comprises allocating at least one of the part of the electrical producers to the electrical consumer such that the determined consumption prediction of the electrical consumer matches to the determined production prediction of the at least one electrical producer and such that the determined distance between the electrical consumer and the at least one electrical producer is at least smaller than at least one further distance limit which is at least larger than the first distance limit to provide distance optimization between the electrical consumer and the at least one electrical producer,
   providing at least one peer-to-peer network comprising at least one peer-to-peer application,
   wherein at least the first allocating step is performed by executing at least one allocating means of the peer-to-peer application by at least a part of the nodes of the peer-to-peer network,
   wherein allocating the at least one electrical producer of the part of the electrical producers to the electrical consumer comprises storing the allocation of the at least one electrical producer of the part electrical producers to the electrical consumer in an inspectable allocation registry storage at least controlled by a peer-to-peer application, and wherein the method further comprises controlling the electrical grid at least also depending on the at least one stored allocation of the at least one electrical producer of the part of electrical producers to the electrical consumer.

2. The method according to claim 1, wherein allocating the at least one electrical producer of the part of the electrical producers to the electrical consumer in a first allocating step such that the determined consumption prediction of the electrical consumer matches to the determined production prediction of the at least one electrical producer comprises allocating one or more electrical producer(s) of the part of the electrical producers to the consumer such that the power expected to be generated by the one or more electrical producer(s) during a specific future time period is essentially equal to the power expected to be consumed by the electrical consumer during the specific future time period.

3. The method according to claim 1, wherein the method further comprises displaying at least the at least one allocation of the at least one electrical producer to the electrical consumer based on the at least one stored allocation of the at least one electrical producer to the electrical consumer.

4. The method according to claim 1, wherein the method further comprises:
   determining a respective type of each of the electrical producers of the part of the plurality of electrical producers,
   wherein allocating the at least one electrical producer of the part of the electrical producers to the electrical consumer depends on the determined type of the at least one electrical producer.

5. The method according to claim 1, wherein determining a distance between an electrical consumer and an electrical producer comprises:
   determining a geographic installation location of the electrical consumer,
   determining a geographic installation location of the electrical producer, and
   determining a distance between the electrical consumer and the electrical producer based on the determined geographic installation location of the electrical consumer and the determined geographic installation location of the electrical producer.

6. The method according to claim 1, wherein
   the at least one allocating step comprises generating at least one allocation transaction agreement about the allocation of the at least one electrical producer to the electrical consumer by means of the peer-to-peer application,
   wherein the allocation transaction agreement comprises at least one of:
      allocating criterion,
      identifier of the at least one electrical producer,
      identifier of the electrical consumer,
      amount of power delivered by the at least one electrical producer, and
      amount of power consumed by the electrical consumer.

7. The method according to claim 1, wherein the method further comprises registering at least one of the electrical consumer and the plurality of electrical producers in the peer-to-peer application by storing at least one identifier assigned to the at least one of the electrical consumer and the plurality of electrical producers.

8. The method according to claim 1, wherein
   the peer-to-peer application is a decentralized register or a shared database,
   wherein the peer-to-peer application is configured to store data with given certain proofs or signatures.

9. The method according to claim 1, wherein the peer-to-peer application is a block chain or decentral ledger comprising at least two blocks coupled to each other.

10. A non-transitory computer program product having a peer-to-peer application for a peer-to-peer network, comprising:
   at least one allocating means configured to allocate at least one electrical producer of a part of the electrical producers connectable to an electrical grid to at least one electrical consumer connectable to the electrical grid in a first allocating step such that a consumption prediction of the electrical consumer matches to the production prediction of the at least one electrical producer and such that a distance between the electrical consumer and the at least one electrical producer is at least smaller than at least one first distance limit to optimize the distance between the electrical consumer and the at least one electrical producer, and
   wherein the allocating means is configured to conduct at least one further allocating step if, in the first allocating step, at least the electrical producers cannot be allocated to the electrical consumer such that the determined consumption prediction of the electrical consumer matches to the determined production prediction of the at least one electrical producer and/or such that the determined distance between the electrical consumer and the at least one electrical producer is at least smaller than at least one first distance limit,
   wherein the second allocating step comprises allocating at least one of the part of the electrical producers to the electrical consumer such that the determined consumption prediction of the electrical consumer matches to the determined production prediction of the at least one electrical producer and such that the determined distance between the electrical consumer and the at least one electrical producer is at least smaller than at least one further distance limit which is at least larger than the first distance limit to optimize the distance between the electrical consumer and the at least one electrical producer,
   providing at least one peer-to-peer network comprising at least one peer-to-peer application,
   wherein at least the first allocating step is performed by executing at least one allocating means of the peer-to-peer application by at least a part of the nodes of the peer-to-peer network,
   wherein allocating the at least one electrical producer of the part of the electrical producers to the electrical consumer comprises storing the allocation of the at least one electrical producer of the part electrical producers to the electrical consumer in an inspectable allocation registry storage at least controlled by a peer-to-peer application, and
   wherein the method further comprises controlling the electrical grid at least also depending on the at least one stored allocation of the at least one electrical producer of the part of electrical producers to the electrical consumer.

11. A system for operating an electrical grid, comprising:
   at least one electrical consumer,
   a plurality of electrical producers, and
   at least one peer-to-peer network with at least one peer-to-peer application according to claim 10.

12. The system according to claim 11, wherein the system further comprises:

at least one peer-to-peer module assigned to the electrical consumer and configured to provide at least one consumption prediction for the electrical consumer to the peer-to-peer application,
and/or
at least one further peer-to-peer module assigned to the electrical producer and configured to provide at least one production prediction for the electrical producer to the peer-to-peer application.

\* \* \* \* \*